April 17, 1956     S. H. SVENSSON     2,741,942
REFRACTOMETER
Filed July 12, 1954             4 Sheets-Sheet 1
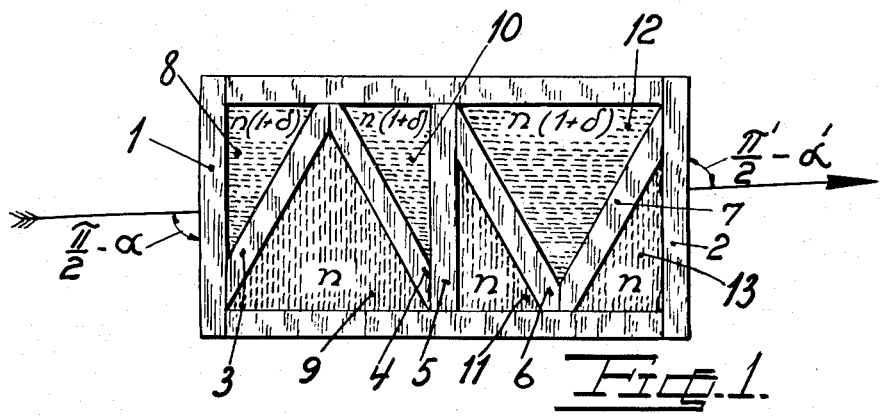
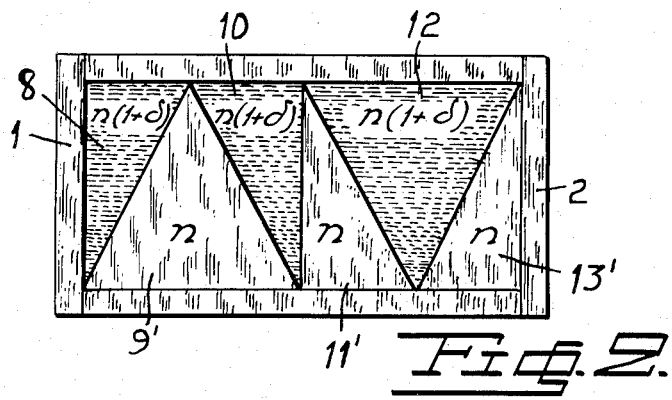
INVENTOR
Svante Harry Svensson
By Pierce, Scheffler & Parker
Attorneys

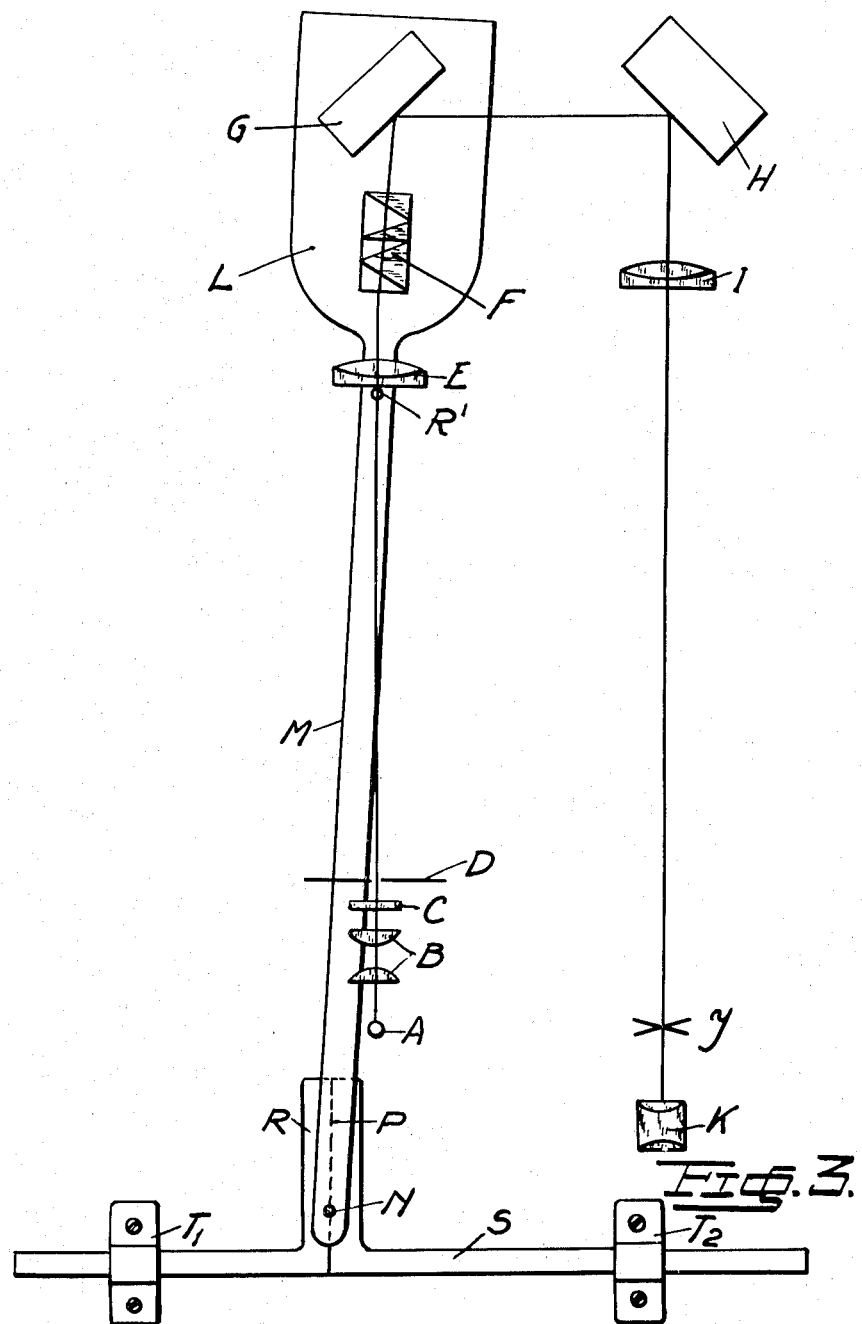

INVENTOR
Svante Harry Svensson
By Pierce, Scheffler & Parker
Attorneys

United States Patent Office 2,741,942
Patented Apr. 17, 1956

2,741,942

REFRACTOMETER

Svante Harry Svensson, Sundbyberg, Sweden, assignor to L. K. B.-Produkter Fabriksaktiebolag, Mariehall, Sweden, a Swedish company Application July 12, 1954, Serial No. 442,828

Claims priority, application Sweden October 16, 1953

15 Claims. (Cl. 88—14)

This invention relates to an improvement in differential refractometers involving an improved refractometric cell having the property of giving a much increased range of linear response over what has been heretofore possible with previously known cell constructions.

Double-prismatic cells have for a long time been used for measurement of small differences in refractivity, see for example S. Claesson, Ark. Kem. Min. Geol. 23 A, No. 1 (1946), D. Zaukelies and A. A. Frost, Anal. Chem. 21, 743 (1949), G. R. Thomas, C. F. O'Konski, and C. D. Hurd, Anal. Chem. 22, 1221 (1950), P. P. Debye, J. Appl. Phys. 17, 392 (1946), B. A. Brice and M. Halwer, J. Opt. Soc. Am. 41, 1033 (1951), R. Cecil and A. G. Ogston, J. Sci. Instr. 28, 253 (1951), G. Kegeles and H. A. Sober, Anal. Chem. 24, 654 (1952), H. Svensson, Acta Chem. Scand. 6, 720 (1952), G. Kegeles, J. Am. Chem Soc. 69, 1302 (1947). Everywhere in this literature it is pointed out that it is only a question of measurement of small differences in refractivity, for which case simple equations give the connection between this refractivity difference and the angular deflection of light in the sample cell. Only at a few places (Brice and Halwer, Kegeles and Sober, Svensson) one can find exact information of how great refractivity differences can be measured without errors using these simple equations.

The inventor has now carried out a detailed analysis of the range of linear response of double-prismatic cells and has then found that it can be extended to cover practically arbitrarily large refractivity differences by the use of a special, compound double-prismatic cell, and by using special devices for a particular orientation of this cell with regard to the incoming light. Already with only one such cell it is possible to reach a considerable degree of proportionality between refractivity difference and light deflection. By using several cells which are coupled parallel or in series, proportionality can be reached within an arbitrarily great refractivity interval.

The invention is illustrated in the accompanying drawings in which:

Fig. 1 is a view in cross-section through one type of a differential cell embodying the invention and wherein the several prisms constituting the reference medium are hollow and filled with a reference liquid medium;

Fig. 2 is a view similar to Fig. 1 but wherein the prisms constituting the reference medium are solid;

Fig. 3 is an illustration of a complete refractometer of which includes a single differential cell embodying the invention;

Figure 4:
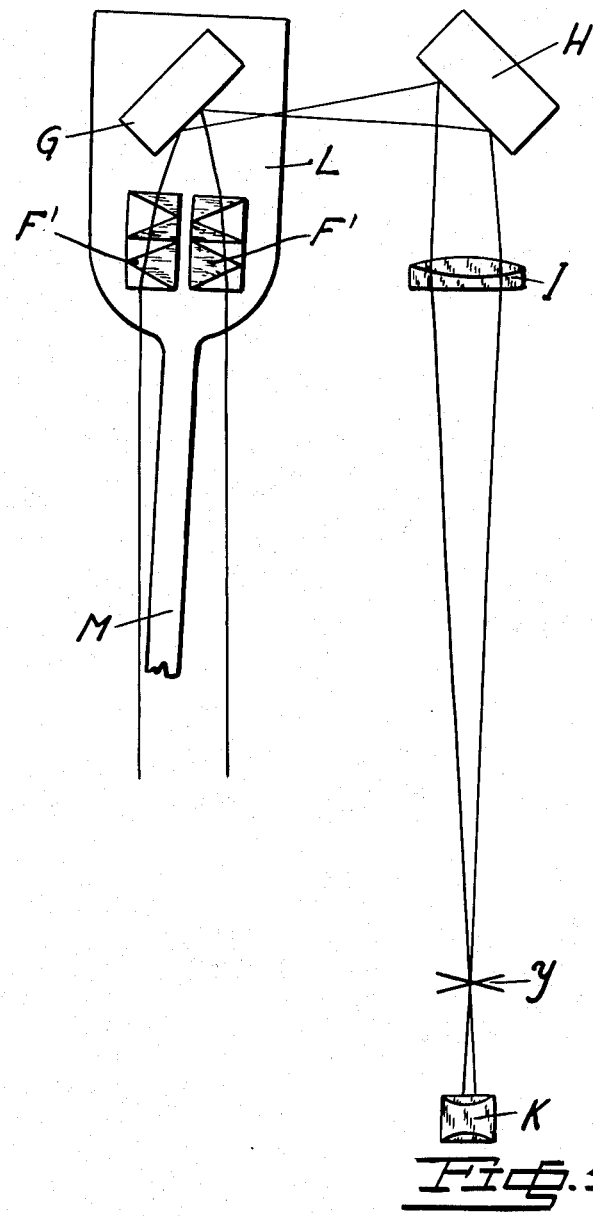
Fig. 4 is a view showing a portion of the apparatus of Fig. 3 modified to include a pair of differential cells each embodying the invention, the cells being arranged in parallel along the light path.

The cell construction that is so suitable in regard to a linear connection between refractivity difference and light deflection, and which constitutes the essence of the present invention, is shown in Fig. 1. It has mutually parallel entrance and exit walls 1 and 2 respectively for the light and between them five intermediate partition walls 3, 4, 5, 6 and 7 between the medium to be measured, with refractivity $n(1+\delta)$, and the reference medium, with refractivity $n$, among which walls the middle one 5 is parallel with the entrance and exit walls 1, 2, while the first and the fifth intermediate walls 3, 7 are mutually parallel and form a certain angle with the outer walls 1, 2, and the second and the fourth intermediate walls 4, 6 are mutually parallel and form the same angle of opposite sign with the middle wall 5. Thus in the cell construction of Fig. 1, the five partitions 3–7 establish six prisms 8–13 in series through which the light passes. The upper prisms 8, 10 and 12 which constitute the medium to be measured alternate with the three lower prisms 9, 11 and 13 which constitute the reference medium in the path of light transmittal through the cell. Such a cell can be regarded as two symmetric double-prismatic cells coupled in series, or as four unsymmetric double-prismatic cells coupled in series. As long as one has a linear dependence only within small refractivity intervals, the reference medium must have a refractivity value close to that to be measured. All component prisms in the compound prism then have to be hollow, so that one can use the liquid that fits best in every particular case as the reference medium. In the present invention, the range of linear response is so great that one can advantageously measure the refractivity of liquids even if the reference medium is glass. The invention of course comprises both cases, viz. that the reference prisms are solid prisms of some optical material, and that they are hollow prisms for a suitable reference liquid.

The range of linear response of a sample cell is defined as that refractivity interval within which a deviation from linear dependence cannot be revealed by the instrument due to its limited optical resolving power. Hence the linear range must be smaller, the greater the optical resolving power. It is also well known that the range of linear response decreases when the sensitivity increases. Therefore, when it is said that the cell according to Fig. 1 has a considerably greater range of linear response than a simple double-prismatic cell, it is tacitly implied that the comparison is made with such a cell of the same optical resolusion and the same sensitivity.

It is then also understandable why a series coupling of two or more cells leads to an increase in the linear range. If two cells are coupled in series, it is necessary to reduce their optical resolving power (i. e. their thickness in the direction of the light) and their sensitivity (i. e. the tangent of the angle between oblique walls and entrance or exit walls) by a factor of 2 in order to retain these data unaltered in the compound cell arrangement. As was pointed out above, both these measures contribute to an increase in the extension of the linear range. This favourable effect of series-coupling of cells has not been pointed out before and constitutes a characteristic feature of this invention. As already mentioned, the cell in Fig. 1 can be regarded as simpler component cells coupled in series. It is true that this contributes to the great linear range of this cell, but the main reason therefor is something else. This lies in the fact that, in the power series:

$$\alpha' - \alpha = A\delta + B\delta^2 + C\delta^3 + \ldots \quad (1)$$

where $\alpha' - \alpha$ is the angular deflection in the cell, $\delta$ the relative refractivity difference, and A, B, C . . . coefficients, the coefficient B is $=0$ for the compound prism in Fig. 1, but $\neq 0$ for the simpler component prisms.

For every double prism, there is an optimum entrance angle $\alpha$, for which the range of linearity is greater than for other entrance angles. For the prism in Fig. 1, this optimum entrance angle is equal to half the angular deflection with reversed sign. A refractometer can be constructed so as to automatically realize this optimum entrance angle for the light at every reading, which is another characteristic feature of this invention.

Further, it can be shown that the sine of the half angular deflection is a more linear function of the refractivity difference than is the angular deflection itself. A third characteristic feature of the invention is to make use of this in order to increase still more the range of linear response by constructing an arrangement which directly measures the sine of the half angular deflection.

On series-coupling of two or more cells according to Fig. 1, the best result in regard to the linearity is obtained if the entrance angle of the light in each cell is equal to half its own angular deflection with reversed sign. An arrangement which at the measurement automatically turns the different series-coupled cells through those angles which are required to satisfy this condition also belongs to the characteristic features of this invention. The range of linear response of $m$ cells coupled in series in this way is $m$ times greater than that of a single cell; hence it is possible in this way to construct a refractometer with proportional response within any desired refractivity interval. It is then no longer necessary to have hollow prisms for a liquid reference medium; one can instead use solid glass prisms as shown at 9', 11' and 13' in Fig. 2, which makes the cell construction considerably cheaper.

Fig. 3 shows a complete refractometer with a single cell according to Fig. 1, which operates under the optimum entrance angle of the light at the cell, and which permits direct reading of the sine of half the angular deflection. A is the light source, B a condensing lens system which throws an image of the light source on the slit D, and C is a light filter. The slit is in the focal plane of the lens E, from which consequently parallel light proceeds against the cell F. After passage of the cell, it is first reflected against the rotatable mirror G, then against the fixed mirror H, which directs it against the telescope lens I. In its focal plane J an optical image of the slit is formed, which is viewed through the ocular K. The group of elements comprising fixed mirror H, lens I and ocular K constitute the "receiver" as defined hereinafter in the claims.

The cell F and the rotatable mirror G are both rigidly mounted on one and the same table L, which is made to turn by the arm M round an axis R' through the middle of the cell and perpendicular to the plane of the paper. In the free end of the arm M, there is a tip N on its underside, which tip glides in the groove P of the block R. The latter is rigidly connected to the bar S, which is guided at $T_1$ and $T_2$ for linear movement in a direction perpendicular to the groove P.

By turning of the mirror G through the half angular deflection, the slit image is brought back to the hair-cross in the telescope. At the same time the cell is turned through the same angle in the same direction, whereby the optimum entrance angle is automatically realized. By the aid of the arrangement M, N, P, R, S, T, it is possible to read directly the sine of the half angular deflection by reading the linear displacement of the bar S with the aid of a suitable device, not shown in the figure.

Figure 5:
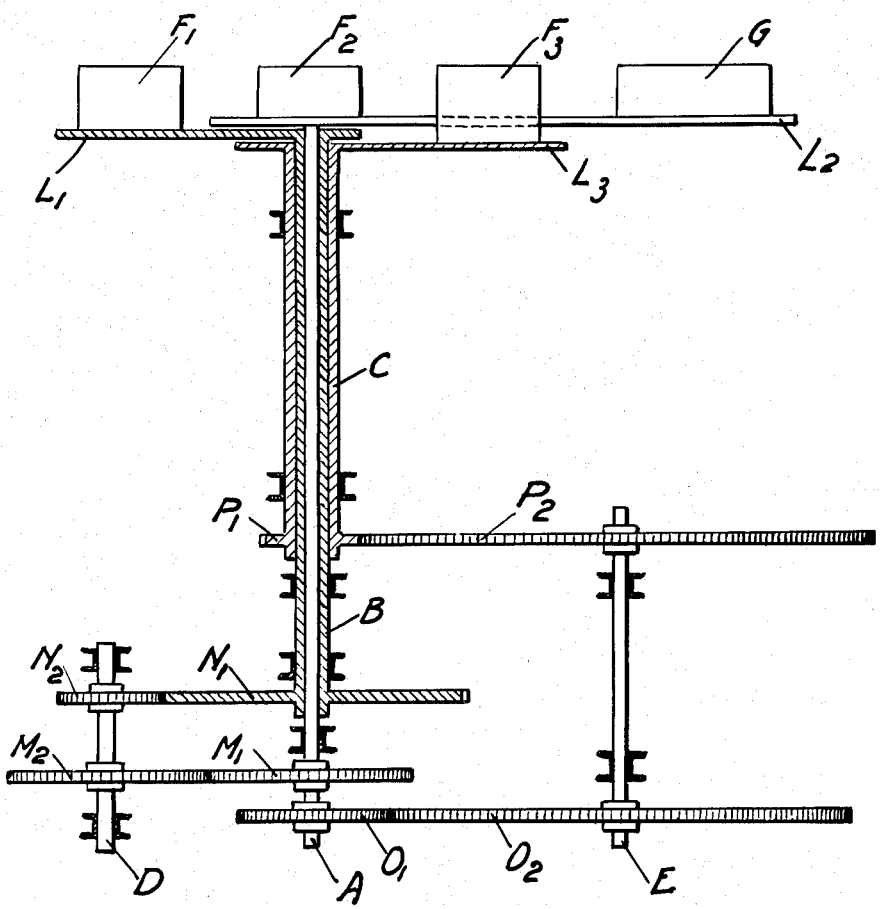
Fig. 5 is a view showing a refractometer employing three differential cells each embodying the invention, the cells being arranged in series along the light path.

Fig. 5 shows a possible arrangement for three cells coupled in series, each of them operating under minimum deviation. The central prism $F_2$ rests on the table $L_2$, which also carries the mirror G and which is rigidly connected to the axis A. The table $L_1$ with the prism $F_1$ is rigidly connected to the hollow axis B, and the table $L_3$ with the prism $F_3$ is in the same way connected to the hollow axis C. The axes A, B, C have thus the same axis of rotation, but different relative angles of rotation, which are defined by the gear-exchange systems $O_1$—$O_2$, $P_1$—$P_2$, $M_1$—$M_2$ and $N_1$—$N_2$. In order to bring back the slit image to the hair-cross of the telescope it is required that the axis A with the prism $F_2$ and the mirror G, is turned through half the total angular deflection, and that the axis B with the prism $F_1$ is turned through 1/6 and the axis C with the prism $F_3$ through 5/6 of the same angle. The exchange ratio between the axes A and B shall thus be 3:1 and that between the axes A and C 3:5. By using this arrangement, it is possible to have prisms possessing each 1/3 of the desired total sensitivity and 1/3 of the desired optical resolving power, and one then obtains a range of linear response which is three times greater than if a single prism of the desired sensitivity and resolving power were used.

It is hardly worth while to couple only two cells in series, since one gets the same result in a simpler manner by coupling them parallel as indicated in Fig. 4 in which event one can then use the same arrangement as that in Fig. 3 with the difference that use is made of two cells F' placed beside each other and parallel or the two cells can be placed on top of each other if desired. The cells should have mutually parallel outer walls but be turned so as to give light deflection in opposite directions. In the plane of the hair-cross one then obtains two slit images which are brought to coincidence with the hair-cross one after the other. At both adjustments, then, the prism giving rise to the slit image under observation is oriented to the optimum entrance angle, and the linear displacement of the axis S between the two adjustments becomes proportional to the refractivity difference in the prisms. In such an arrangement, each prism can be given half of the desired sensitivity and optical resolving power, and one then obtains a range of linear response which is twice as large as if one single prism of the same desired sensitivity and resolving power were used.

I claim:

1. In a refractometer cell, the combination comprising mutually parallel, spaced entrance and exit end walls for passage of light through the cell, and five walls intermediate said end walls, the middle one of said intermediate walls being parallel with said entrance and exit end walls, the first and fifth of said intermediate walls being mutually parallel and disposed at a given angle relative to said end walls, and the second and fourth of said intermediate walls being also mutually parallel and disposed at the same angle as said first and fifth walls in relation to said end walls but of the reverse sign, said intermediate walls together with said end walls establishing two groups of three prismatic components each arranged in series for the passage of light therethrough, the prismatic components of one group alternating with the prismatic components of the other group along the path of light through said cell, one group of said prismatic components being constituted by the medium to be measured, and the other group of said prismatic components being constituted by the reference medium.

2. A refractometer cell as defined in claim 1 wherein all of said prismatic components are hollow, the prismatic components of one group being adapted to be filled with the medium to be measured, and the prismatic components of the other group being adapted to be filled with the reference medium.

3. A refractometer cell as defined in claim 1 wherein the prismatic components of the group constituting the reference medium are solid bodies of an optically homogeneous material of known refractivity, and wherein the prismatic components of the other group are hollow bodies adapted to be filled with the medium to be measured.

4. A refractometer comprising a cell as defined in claim 1, a turn table to which said cell is fixedly secured, a source of light, collimating means for said light, a receiver for the light passed through said cell, the light beam from said source being directed through said collimating means into the entrance end wall of said cell and thence out of the exit wall of said cell into said receiver, the rotation of said table being coupled to relative turning movement between said light beam subsequent to deflection in said cell and said receiver such that said cell is turned through half the angle through which the deflected beam is turned relative to said receiver.

5. A refractometer as defined in claim 4 wherein said collimating means and said receiver are fixed in position, and which further includes a rotatably mounted mirror for reflecting the light from the exit wall of said cell into said receiver, rotating movement of said cell being directly coupled to rotation of said mirror, the light emanating from the exit end wall of said cell being turned through an angle equal to the angular deflection of the light beam in said cell by turning said mirror through half said angle.

6. A refractometer as defined in claim 5 in which said mirror and said cell are fixedly mounted on a common turntable.

7. A refractometer as defined in claim 4 and which further includes an arm to one end of which said turn table is attached for rotation, the opposite end of said arm being provided with a tip slidable in a groove in a block member, said block member being linearly displaceable in a direction perpendicular to said groove, whereby the sine of the angular movement of said turntable is directly proportional to the linear displacement of said block.

8. A refractometer comprising a pair of cells each as defined in claim 1, a rotatable support to which said cells are fixedly secured in parallel relation to each other, a source of light, a receiver, and collimating means for directing the light from said source through said cells for deflection of the light in opposite directions to said receiver.

9. A refractometer as defined in claim 8 and which further includes a rotatable mirror for reflecting the light into said receiver after being deflected in said cells.

10. A refractometer comprising a plurality of cells each as defined in claim 1, said cells being arranged in series relative to passage of light therethrough and means for passing a light beam through said series arranged cells, said cells being oriented to effect deflection of light in the same direction.

11. A refractometer as defined in claim 10 comprising $m$ cells arranged in series, means for turning a first cell through an angle equal to the total angular deflection divided by $2m$, means for turning a second cell through an angle equal to three times as large, and means for turning a third cell through an angle five times as large.

12. A refractometer as defined in claim 11 including a receiver for the light passed through said cells, a mirror for reflecting the light subsequent to passage through all of said cells into said receiver, and means for turning said mirror through an angle equal to the arithmetric means of the angles through which all of said cells are turned.

13. A refractometer as defined in claim 12 constituted by an odd number of cells, and wherein said means for turning said mirror is identical with the means for turning the middle one of said odd number of cells.

14. A refractometer as defined in claim 12 wherein the means for turning said mirror includes an arm at one end of which said mirror is mounted, a tip at the other end of said arm, said tip being slidable in a straight groove provided in a block, and means for displacing said block linearly in a direction perpendicular to said groove thereby to provide a direct reading of the sine of the half angular deflection.

15. A refractometer comprising at least one cell as defined in claim 1, a rotatable support for said cell, a mirror fixedly mounted on said support, a receiver for the light passed through said cell, a source of light, and collimating means for said light, said collimating means being arranged to direct light through said cell to said mirror and thence by reflection to said receiver and means for rotating said cell support.

No references cited.